(No Model.)
M. B. BAILEY.
ELECTRIC LAMP POLE.
No. 567,116. Patented Sept. 1, 1896.
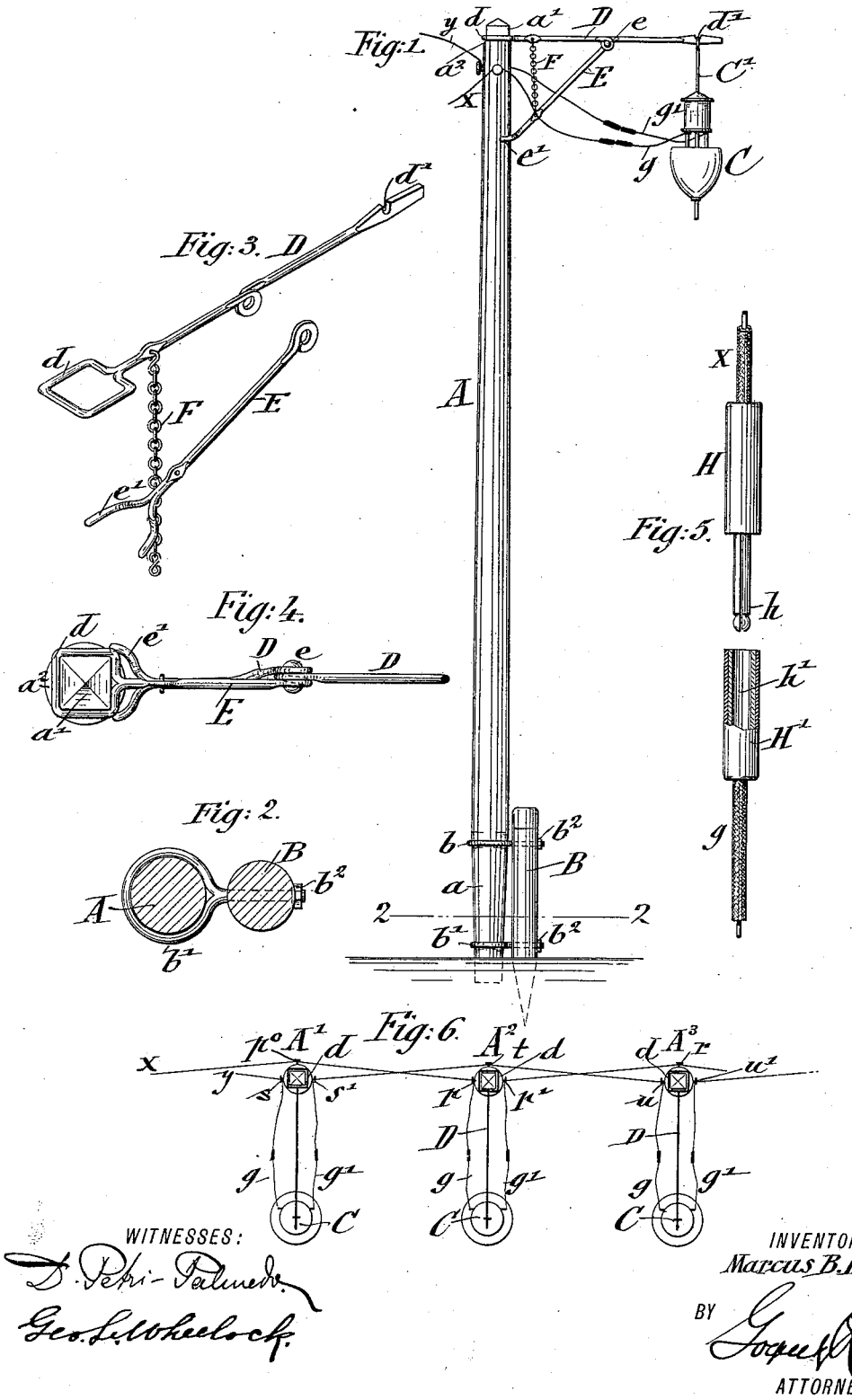
WITNESSES:
INVENTOR
Marcus B. Bailey
BY
ATTORNEYS

UNITED STATES PATENT OFFICE.

MARCUS B. BAILEY, OF BROOKLYN, NEW YORK.

ELECTRIC-LAMP POLE.

SPECIFICATION forming part of Letters Patent No. 567,116, dated September 1, 1896.

Application filed March 24, 1896. Serial No. 584,639. (No model.)

*To all whom it may concern:*

Be it known that I, MARCUS B. BAILEY, a citizen of the United States, residing at Brooklyn, in the county of Kings and State of New York, have invented certain new and useful Improvements in Electric-Lamp Poles, of which the following is a specification.

This invention relates to certain new and useful improvements in electric-lamp poles, the object of the same being to provide a portable pole which can be readily taken apart for shipment and can be quickly put up for use, making, as it were, a sort of knock-down pole, which is specially adapted for use with traveling shows, in places where buildings have to be erected during the night, and in similar cases.

The invention consists of a stake which is adapted to be driven into the ground and is provided with eyes forming sockets for receiving the tapering lower end of the pole proper, and a bracket which is adapted to be folded and is provided with an eye on the supporting-arm for the lamp, which eye fits snugly onto the upper end of the pole proper, and with a brace which is provided with a bifurcated end that bears against the pole proper at a point below the supporting-arm, as will be fully described hereinafter, and finally pointed out in the claims.

In the accompanying drawings, Figure 1 is a side elevation of my improved portable electric-lamp pole. Fig. 2 is an enlarged transverse section on line 2 2 of Fig. 1. Fig. 3 is a detail perspective view of the bracket-fixture for supporting the lamp, showing the supporting-arm and the brace detached. Fig. 4 is an enlarged detail top view of Fig. 1. Fig. 5 is a detail side elevation showing the socket-connector for the line-wires, and Fig. 6 is a diagrammatic view showing the system whereby the lamps are connected alternately together by separate line-wires.

Similar letters of reference indicate corresponding parts.

The pole proper, A, is formed with a tapering lower end $a$, which is inserted in sockets formed by the eyes $b\ b'$ of eyebolts, which project laterally from a stake B, that is driven firmly into the ground, said eyebolts being secured to the stake by means of nuts $b^2$. The upper end of the pole A is formed with a reduced portion $a'$, which is adapted to receive the eye $d$ of the supporting-arm D, forming part of the bracket-fixture for supporting the electric-arc lamp C, said eye resting upon the shoulder $a^2$, formed below the reduced portion. Pivoted to or detachably connected with the supporting-arm D by means of a pivot-pin $e$ is a brace E, which at its lower end is provided with a fork $e'$, that rests against the side of the pole A and supports the supporting-arm B in horizontal position in connection with a chain F, which extends from the supporting-arm D to the brace E. The outer end of the supporting-arm D is formed with a recess $d'$ in its upper side, in which engages an eye on the hanger C' of the electric-arc lamp C.

Short leading-in wires $g\ g'$ extend from the carbons of the electric-arc lamp C for supplying current to the carbons when the said leading-in wires are connected with the line-wires.

Referring to Fig. 6, it will be seen that the line-wires $x\ y$, which conduct current to the lamps, respectively, skip alternate lamps, that is to say, the line-wire $x$ is connected with a binding-post $p^0$ on the first pole A', and then passes to and is connected with a binding-post $p$ at the adjacent side of the next pole A², where the main line-wire is broken, its next portion being connected with a binding-post $p'$ at the opposite side of the pole A², from whence it leads to a binding-post $r$ at the rear of the next pole A³. The main line-wire $y$, instead of supplying current to the lamp supported by the intermediate post A², supplies current to the lamps at either side of the same, it being connected with binding-posts $s\ s'$ at opposite sides of the pole A', with a binding-post $t$ at the back of the intermediate post A², and with the binding-posts $u\ u$ at opposite sides, respectively, of the next post A³. At the post A' where the main line-wire $y$ is broken, at the post A² where the main line-wire $x$ is broken, and at the post A³ where the main line-wire $y$ is further broken the broken ends of said wires must be provided with suitable means whereby the electric-arc lamps C may be electrically connected therewith. This is accomplished by means of handles H, (see Fig. 5,) connected with the broken ends of the main line-wires, which are provided with spring-plugs $h$, that are adapted to be inserted in cylindrical handles H', carried by the free ends of the leading-in wires g g', which handles H' are provided with sockets h', into which the springplugs h are sprung, whereby the electric connection of the electric-arc lamps with the main line-wires is established.

I prefer to supply current to the line-wires x and y, respectively, from two different sources of electrical energy, and in practice this is done by establishing connection with dynamos which are mounted on two wagons, which are also equipped with a boiler and steam-engine, together with other accessories of an electric-arc-light plant, as described in a contemporaneous application, Serial No. 584,638, filed March 24, 1896. These poles, when provided with the connections described, can be quickly put up and can be readily taken to pieces for storage and packing for shipment, furnishing thereby a very desirable accessory in the way of lights for grounds and tents of traveling shows.

Having thus described my invention, I claim as new and desire to secure by Letters Patent—

1. A knockdown pole for electric-arc lamps, consisting of a stake provided with an upper eye and a smaller lower eye forming sockets, a removable pole proper having a tapering lower end inserted into the sockets, and a detachable lamp-supporting bracket applied to the upper end of the pole proper, substantially as set forth.

2. A knockdown pole for electric-arc lamps, consisting of a stake adapted to be driven into the ground and provided with a socket, a pole proper the lower end of which is adapted to be inserted into the socket, and the upper end of which is reduced to form a shoulder, and a lamp-supporting bracket adapted to be removably applied to the pole, said lamp-supporting bracket comprising a supporting-arm having an eye at its inner end, and a brace resting against the pole, said eye receiving said reduced end of the pole proper.

3. The herein-described supporting-bracket for electric-arc lamps, consisting of a supporting-arm provided with an eye at one end and with means for holding the electric-arc lamp at the other end, and a brace connected to the supporting-arm and provided with a forked outer end, substantially as set forth.

In testimony that I claim the foregoing as my invention I have signed my name in presence of two subscribing witnesses.

MARCUS B. BAILEY.

Witnesses:
GEO. L. WHEELOCK,
GEO. W. JAEKEL.